United States Patent [19]

Morgan

[11] Patent Number: 5,513,003
[45] Date of Patent: Apr. 30, 1996

[54] FIBER OPTIC GYRO DIGITAL CONTROL WITH RATE EXTENSION

[75] Inventor: Avery A. Morgan, St. Petersburg, Fla.

[73] Assignee: Honeywell Inc., Minneapolis, Minn.

[21] Appl. No.: 254,804

[22] Filed: Jun. 6, 1994

[51] Int. Cl.[6] .................................................. G01C 19/64
[52] U.S. Cl. ............................................................. 356/350
[58] Field of Search ................................................ 356/350

[56] References Cited

U.S. PATENT DOCUMENTS

| 4,299,490 | 11/1981 | Cahill et al. | 356/350 |
| 4,372,685 | 2/1983 | Ulrich et al. | 356/350 |
| 4,480,915 | 11/1984 | Arditty et al. | 356/350 |
| 4,705,399 | 11/1987 | Graindorge et al. | 356/350 |

FOREIGN PATENT DOCUMENTS 7930723 12/1979 France.

OTHER PUBLICATIONS

"Integrated Optics: A Practical Solution for the Fiber–Optic Gyroscope" Author: H. C. LeFevre, S. Vatoux, M. Papuchon and C. Puech–10th Anniversary Conf. (1986), pp. 101–112.
"An Overview of Fiber–Optic Gyroscopes" Author: Ralph A. Bergh, H. C. LeFevre and Herbert J. Shaw–1984 IEEE, pp. 91–107.

Primary Examiner—Vincent P. McGraw
Attorney, Agent, or Firm—Charles J. Ungmach

[57] ABSTRACT

A digitally operated fiber optics gyro system in which the $2\pi/SF$ rate limit has been removed by storing the number of $2\pi$ reset that have occurred and combining this with the signal sensed by the light sensor.

7 Claims, 2 Drawing Sheets

FIBER OPTIC GYRO DIGITAL CONTROL WITH RATE EXTENSION

BACKGROUND OF THE INVENTION

1. Field of the Invention

The present invention relates to fiber optic gyros and more particularly, to a rate extension improvement to fiber optic gyros with digital control.

2. Description of the Prior Art.

In a paper entitled "INTEGRATED OPTICS : A PRACTICAL SOLUTION FOR THE FIBER-OPTIC GYROSCOPE" BY H. C. Lefevre, S. Vatoux, M. Papuchon and C. Puech presented to the 10th Anniversary Conference 1986 of SPIE and printed in SPIE Vol. 719 Fiber Optic Gyros on pages 101–112, a digitally controlled closed loop fiber optic gyro is discussed primarily on pages 103 and 104. In such a closed loop system, as will be explained below, the system supplies a re-balance voltage in the form of a ramp voltage (occurring in a series of steps) to a phase modulator which operates on the counter-rotating beams to introduce a differential phase shift to the light beams which phase shift counterbalances the phase shift which is due to the rotation being measured. The consequences of this action is observed with a photo-diode detector which provides the feedback signal. To prevent too much build up of voltage into the modulator, the stepped signal ramp is reset toward zero by $2\pi$ radians of the light phase as needed. Under normal circumstances, this makes no difference since the photo-diode detector provides the same output for a differential phase shift angle $2\pi + \alpha$ as for an angle $\alpha$. A difficulty with this approach is that there is a rate limit beyond which more than one $2\pi$ resets is needed to keep the modulator voltage within range during a single step. This limit occurs at a value of $2\pi/SF$ radians/second where SF is the scale factor relating the Sagnac phase shift to the input rate of the gyro. Above the $2\pi/SF$ rate limit, the prior art system cannot properly determine rates.

BRIEF DESCRIPTION OF THE INVENTION

The present invention removes the $2\pi/SF$ rate limit in the digitally operated fiber optics gyro of the prior art by keeping track of the number of $2\pi$ intervals in the Sagnac phase estimate and using them in combination with the value of the signal used for re-balance to determine the actual rate. If the system is first started at a high rate, an additional input may be needed to initialize the process so that it will converge to the correct rate. The procedure for handling this initialization is part of the invention.

DETAILED DESCRIPTION OF THE PREFERRED EMBODIMENT

Figure 1:
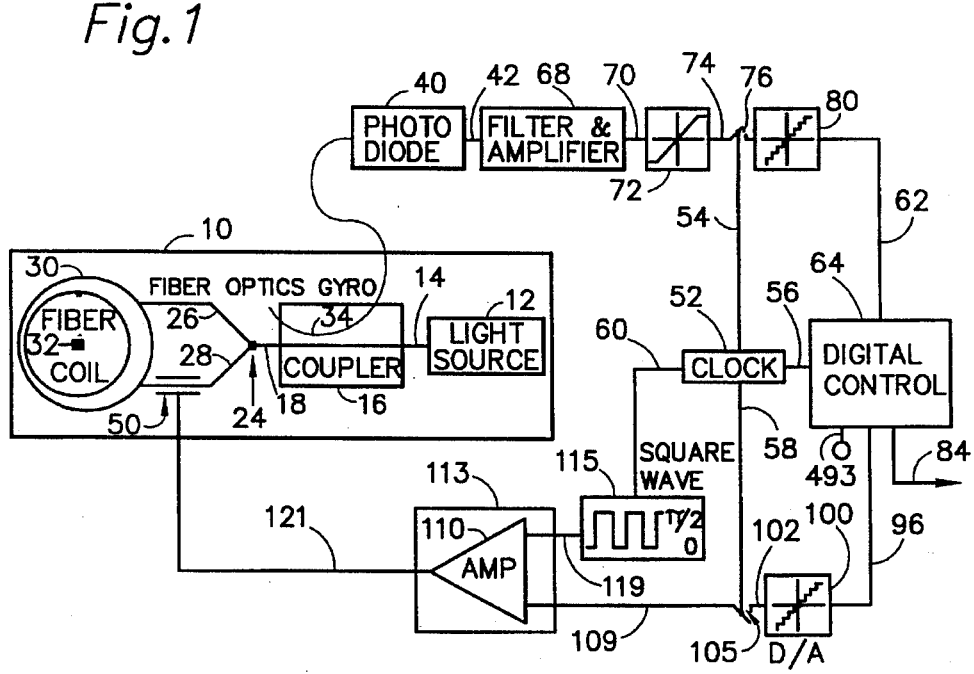
FIG. 1 is a block diagram of the digitally controlled fiber optic gyro utilizing the present invention.

In FIG. 1, a fiber optics gyro box 10 is shown to include a light source 12, which may be a laser, producing a light beam shown by line 14 to a coupler 16 which transmits the beam along a line 18 to a beam splitter 24 where the beam is divided and travels along paths 26 and 28 to the two ends of a fiber coil 30. The light travels around coil 30 in both directions and if coil 30 is rotating about an axis shown as dot 32, perpendicular to coil 30's plane, the light propagated in one direction travels a little further than the light propagated in the other direction with the result that a Sagnac phase shift occurs between them.

The returning light with the phase shift passes back through the beam splitter 24 to the coupler 16 where a pickoff 34 transmits the light to a photo-diode 40 whose output, I, on a line 42 will change with the phase shift of the counter-rotating light beams in coil 30 and thus with the rate of rotation about the axis 32 as will be described in connection with FIG. 2. In a closed loop system, the photo-diode 40 output on line 42 is used to generate a feed-back signal to a phase modulator 50 such as a lithium-niobate integrated optical or piezo-electric device that operates to introduce a path length change in one end of the coil 30. Although modulator 50 introduces the path length change to light in the two beams simultaneously, it operates on the beam just leaving the coil after traversing the length of the coil and on the beam just entering the coil before traversing the distance, a differential phase is introduced which can be made to counteract the effect of path length change due to rotation. The signal driving the phase modulator 50 to cause an error signal derived from the output of photo-diode 40 to be controlled to zero is then indicative of the rate of rotation.

The operation of the gyro 10 is based on observing light intensity, which is a function of the phase shift between the two beams of light around the coil 30 affected by the Sagnac phase and the phase modulator 50. The total phase shift $\phi$ is the difference between the Sagnac phase $\phi_s$ and the control phase $\phi_c$, given by the equation $$\phi = \phi_s - \phi_c \tag{1}$$

where the Sagnac phase shift $\phi_s$ results from the input rate $\omega$, given by the equation $$\phi_s = SF\,\omega \tag{2}$$

and the control phase shift $\phi_c$ at time t, is the differential phase shift from the modulator 50 over loop time $\tau$, given by the equation $$\phi_c = \eta(t-\tau) - \eta(t) \tag{3}$$

where $\eta(t)$ is the phase shift applied by the phase modulator 50 at time t and $\eta(t-\tau)$ is the phase shift applied by the phase modulator 50 at time $t-\tau$. The observable is the light intensity I on line 42 which is related to the total phase $\phi$ by the equation $$I = \frac{I_o}{2}(1+\cos\phi) \tag{4}$$

where $I_o$ is the peak light intensity. SF is the scale factor relating rate $\omega$ to the Sagnac phase shift and is given by the equation;

$$SF = 2\pi DL/c\lambda \tag{5}$$

where
- L is the length of the fiber;
- c is the speed of light;
- D is the diameter of the coil 30; and
- λ is the wave length.

The time for the beams to travel the coil 30 is τ, which is given by the equation:

$$\tau = nL/c \qquad (6)$$

where n is the refractive index of the fiber.

The digital control used to provide the closed loop system is operated with period $\Delta t$ which is a time increment established by a clock 52 which is intended to equal coil period τ. The output of clock 52, whose connections are indicated by dashed lines 54, 56, 58, and 60 occur simultaneously. The error signal is the differences of successive samples of light intensity on a line 62 demodulated at period $\Delta t$ in a digital controller 64. The signal indicative of light intensity on line 62 is a digital signal resulting from the analog output on line 42 from photo-diode 40 which has been passed through a filter and amplifier 68, through a connection 70, a limit box 72, through connection 74, a high frequency sampler, shown as a switch 76 and through an A/D converter 80. Limit box 72 prevents the larger signals which may exist in the output of photo-diode 40 and the filter and amplifier 68 from exceeding the range of A/D converter 80. Digital controller 64 is connected to clock 52 by the connection 56 and contains a memory and a computer and operates to determine the feed back signal to the phase modulator 50 as well as to produce an output on a line 84 which is presented to downstream electronics, flight processor and/or indicators (not shown) to provide the flight system or the operator with information as to the rates and angles encountered by the gyro 10.

The desired feedback signal generated by the digital controller 64 is produced on line 96 which is connected to a D/A converter 100 where the signal is converted back to an analog signal on a line 102 and presented to a second high frequency sampler shown as a switch 105, which is also driven by clock 52 through the connection 58. The sampled analog signal representative of the phase shift is presented by a line 109 to one input terminal of a differential amplifier 110 in the feedback electronics box shown by dashed lines 113. A square wave generator 115 which receives a signal from clock 52 over the line 60 produces a square wave signal varying from zero to $\pi/2$ on a line 119 to a second input of amplifier 110. The output of amplifier 110 is presented over a line 121 to the phase modulator 50 to provide the feedback necessary to maintain the error signal at zero.

The purpose of the gyro control is to obtain an angle which is a measurement of the integral of rate ω in respect to time. The procedure is to cause a cyclic variation of modulator phase shift η with period $\Delta t$ through a periodic phase γ to cause a cyclic variation of control phase $\phi_c$. The result, from equation (4) above, is a cyclic variation in light intensity, I, also at period $\Delta t$. This periodic measurement of the light intensity is demodulated to provide an error signal which is used to update a parameter ρ, which is an estimate of the Sagnac phase $\phi_s$. Sagnac estimate ρ is summed to produce angle α which is summed with square wave angle γ to produce modulator phase η. In this manner the demodulated light intensity is adjusted until phase ρ equals Sagnac phase $\phi_s$, for which condition ω is obtained from ρ based on equation (2) above, and the integral of rate is obtained from α. Parameters ρ and α are numbers in digital controller 64. Parameter α is converted to a voltage with D/A converter 100 and, after being summed with square wave γ in amplifier 110, is converted to phase with phase modulator 50. Parameter γ is produced as a voltage on connection 119 from square wave generator 115, and after being summed with α in amplifier 110 is also converted to phase with phase modulator 50. Parameters ρ, α, γ, η, $\phi_c$, and $\phi_s$ are components of total phase $\phi$.

Figure 2:
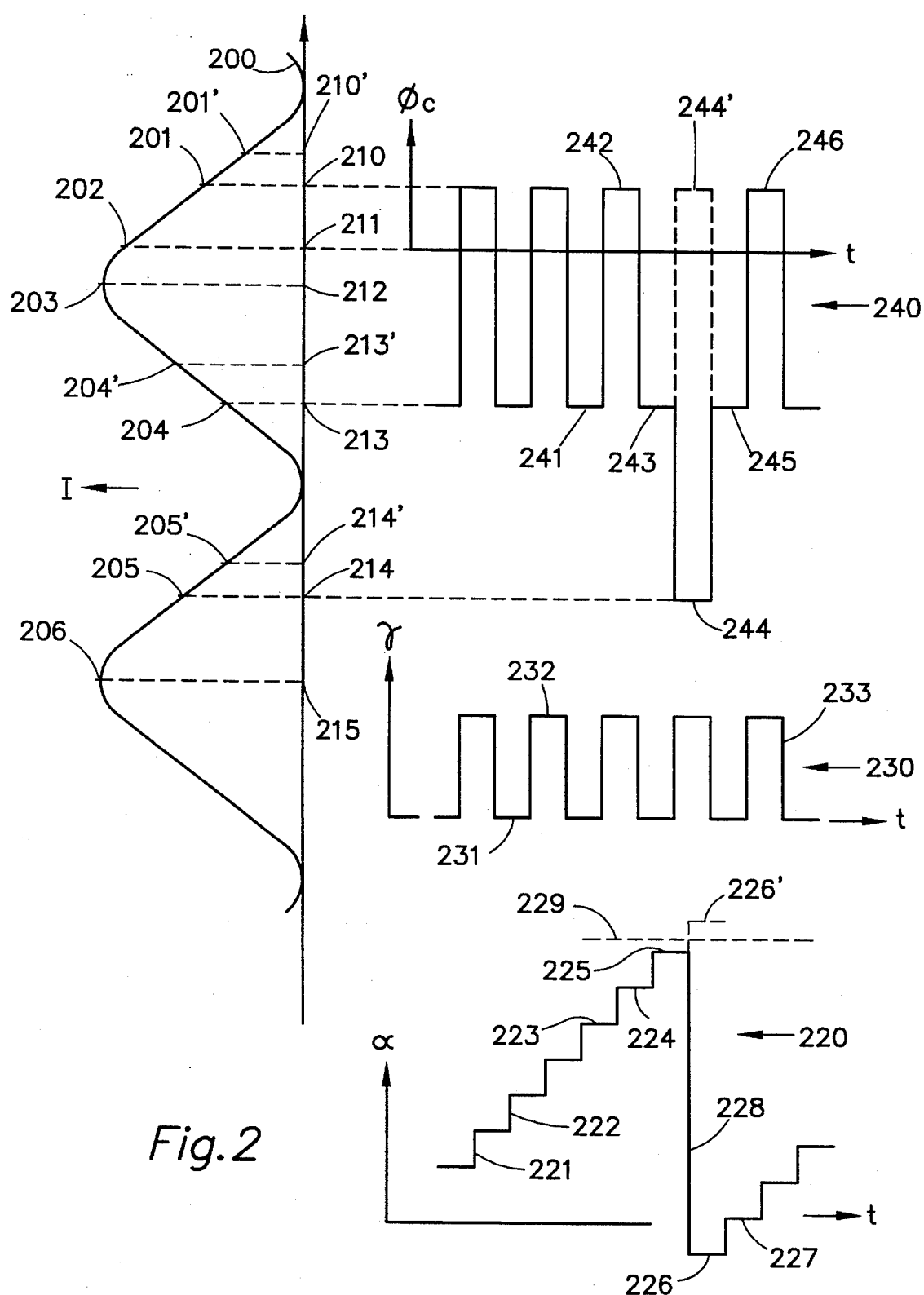
FIG. 2 is a graph of the output of the photo diode sensor as a function of phase showing the relation between Sagnac phase, controller phase, and its components, showing an input at a first rate lower than $2\pi/SF$.

The operation of the closed loop is explained in FIG. 2, in which line 200 is light intensity, I, from photo-diode 40 plotted against total phase $\phi$; line 220 is staircase signal α from digital controller 64 output on line 96 of FIG. 1 plotted against time, t; line 230 is square wave γ from square wave generator 115 of FIG. 2 plotted against time t, and; line 240 is commanded phase $\phi_c$ from the difference of successive values of the sum of γ and α over loop time τ. Point 212 is the zero reference of $\phi$. Point 211 is the Sagnac phase caused by input rate ω relative to point 212, and is also the zero reference to $\phi_c$. The step size of line 220, indicated by the lines marked as 221 and 222, or the distances between levels 223 and 224, between levels 224 and 225, and between levels 226 and 227, is ρ. The distance between successive steps of line 230, as in between lines 231 and 232, and marked as step 233, is $\pi/2$. When the error signal is zero, phase $\phi$ is caused to alternate between points 210 and 213 so that light intensity I alternates between points 201 and 204. The difference between the light intensities at points 201 and 204 is the error signal, which in this case is zero. For this condition, the distance between point 211 and point 212 is ρ as well as $\phi_s$, making ρ a measure of $\phi_s$ and thus a measure of rate ω.

To prevent the voltage on line 121 of FIG. 1 from exceeding the capability of phase modulator 50, the value of α, as shown on line 220, is tested against a threshold value shown as dashed line 229. Rather than stepping through ρ from level 225 to level 226', α is caused to step to level 226 where the distance between level 226' and level 226 is $2\pi$. This occurs at the time identified by line 228. This action causes command phase $\phi_c$ to step from level 243 to level 244 rather than to level 244'. This action causes the total phase $\phi$ to step from point 213 to point 214 rather than to point 210. The light intensity at point 205 caused by the phase at point 214 is the same as the light intensity at point 201 caused by the phase at point 210 causing the error signal to be the same as if $\phi$ had stepped to point 210 instead of point 214. After this $2\pi$ reset action, the control pattern resumes as before, stepping between levels 245 and 246, and so on. The number of $2\pi$ resets, accounting for direction, in combination with α provides the angle output information of the gyro. If ρ was less than $\phi_s$, then phase command $\phi_c$ would be shifted such that phase $\phi$ would oscillate between point 210' and point 213' rather than between point 210 and point 213. For this condition the light intensity would alternate between point 204' and point 201'. The fact that the light intensity at point 204' is greater than the light intensity at point 201' is an indication that ρ should be increased. The procedure is to increase ρ until the error is fully corrected.

Figure 3:
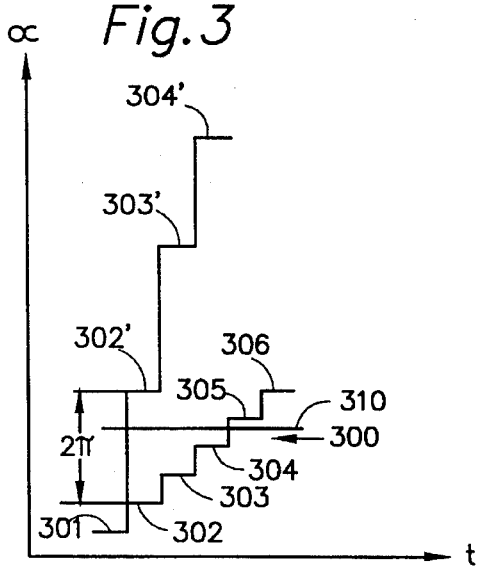
FIG. 3 is a graph showing the change in input to the phase modulator at a second rate higher than $2\pi/SF$ without the correction of the invention being applied.
Figure 4:
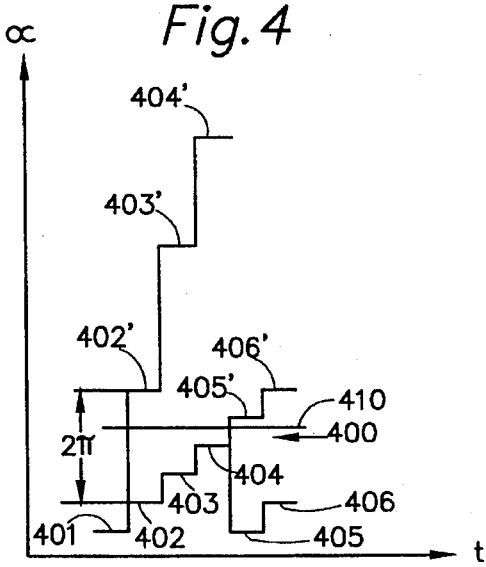
FIG. 4 is a graph showing the change in input to the phase modulator at a second rate higher than $2\pi/SF$ with the correction of the invention being applied.

A difficulty occurs in the prior art when ρ exceeds $2\pi$ such that a $2\pi$ reset each cycle no longer adequately constrains the input to the phase modulator. The present invention solves this difficulty by applying $2\pi$ resets to ρ in the same manner that the prior art applies $2\pi$ resets to α. Whenever ρ exceeds its threshold, it is adjusted toward zero by $2\pi$, with the number of such events counted, accounting for direction. With this implementation ρ becomes equal to the Sagnac phase $\phi_s$ plus a known integer multiple of $2\pi$. The difficulty of the prior art is explained in FIG. 3 which shows a line 300 as a plot of α against time t for a case in which the step size, $\rho$, is greater than $2\pi$. In FIG. 3, $\rho$ is the distance between level 301 and level 302', and between level 302' and level 303' etc. For this case a $2\pi$ reset occurs at each step causing $\alpha$ to step from level 301 to 302 to 303, and so on. In the step from level 304 to 305, $\alpha$ crosses a threshold indicated by dashed line 310, and continues to increase upward from level 306. This action will cause the capability of phase modulator 50 to be exceeded. The correction to this difficulty is seen in FIG. 4, showing line 400 as a plot of $\alpha$ against t for a case in which p is reduced by $2\pi$. In FIG. 4 $\rho$ is the distance between levels 401 and 402, and between levels 402 and 403, and so on. As in the case of the prior art, when $\alpha$ exceeds threshold 410 a $2\pi$ reset in $\alpha$ is applied causing the next level after 404 to be 405 rather than 405', where the distance between levels 405 and 405' is $2\pi$. Since $\rho$ has been reduced by $2\pi$, the reset counter on $\alpha$ must be incremented by 1 for each step, with the exception of the step between level 404 and 405, at which the counter must be incremented by 2. This situation can be further understood from FIG. 2 by considering a situation in which the zero reference for phase $\phi$ was at point 215 instead of at point 212. In this case nothing about the previous description of the closed loop operations would be altered except that $\rho$ would be controlled to the Sagnac phase minus $2\pi$ instead of to the Sagnac phase.

Another difficulty with the prior art results from the multiple of $2\pi$ ambiguity in the relation between the observed light intensity and the Sagnac phase. For example, in FIG. 2, peak 206 cannot be distinguished from peak 203, so that it cannot be determined whether the Sagnac phase at point 211 is near to point 212 or near to point 215 (separated by $2\pi$). This is overcome in the prior art by requiring the initial rate be near zero. This restriction is overcome here by solving for an initial estimate of the Sagnac phase based on a rate estimate from an external source, shown as line 493 into digital controller 64. The external source may be a lessor quality gyroscope, such as a spinning mass gyro, or another fiber optics gyro with a greater rate range. As may be recognized by those familiar with the art, there are many means of achieving an estimate of rate sufficient to distinguish between the light intensity peaks.

Controller Equations

The preferred embodiment is a sampled data process whose equations and logic are solved with a period $\Delta t$. In their simplest form, the processing equations are;
if (L1=true) then $$L1 = \text{false} \tag{7}$$

$$\Delta\rho = gc\ \{I(t) - I(t-\Delta t)\} \tag{8}$$

$$\gamma = 0 \tag{9}$$

else $$L1 = \text{true} \tag{10}$$

$$\Delta\rho = -gc\ \{I(t) - I(t-\Delta t)\} \tag{11}$$

$$\gamma = \pi/2 \tag{12}$$

end $$\rho(t) = \rho(t-\Delta t) + \Delta\rho \tag{13}$$

$$\alpha(t) = \alpha(t-\Delta t) + \rho(t) \tag{14}$$

if ($\alpha(t) \geq 2\pi$) then $$\alpha(t) = \alpha(t) - 2\pi \tag{15}$$

$$\beta(t) = \beta(t-\Delta t) + 1 \tag{16}$$

else if ($\alpha(t) \leq 0$) then $$\alpha(t) = \alpha(t) + 2\pi \tag{17}$$

$$\beta(t) = \beta(t-\Delta t) - 1 \tag{18}$$

end $$\eta(t+\Delta t) = \alpha(t) + \gamma \tag{19}$$

The cumulative output angle $\theta_m$ is obtained by scaling $\beta$ and $\alpha$, and rate $\omega_m$ is obtained from $\rho$ as follows.

$$\theta_m = \left(\frac{\Delta t}{SF}\right)(2\pi\beta(t) + \alpha(t)) \tag{20}$$

$$\omega_m = \frac{\rho(t)}{SF} \tag{21}$$

The above equations are without $2\pi$ correction and are not valid when the fiber optics gyro 10 is operated at high rotation rates. Accordingly, the following equations are employed to provide the desired advantage of the present invention:

Rate Extension $$\beta = \beta + \eta_{\Delta\rho} \tag{22}$$

if ($\rho > 2\pi$) then $\tag{23}$ $$\rho = \rho - 2\pi \tag{24}$$

$$\eta_{\Delta\rho} = \eta_{\Delta\rho} + 1 \tag{25}$$

else if ($\rho < -2\pi$) then $\tag{26}$ $$\rho = \rho + 2\pi \tag{27}$$

$$\eta_{\Delta\rho} = \eta_{\Delta\rho} - 1 \tag{28}$$

end

The implementation of the present invention replaces equation 21) with $$\omega_m = \frac{\rho(t) + n_{\Delta\rho}2\pi}{SF} \tag{29}$$

This equation describes the step of scaling the number of $2\pi$ resets ($\eta_{\Delta\rho}$) and adding the result of the rate remainder, $\rho$, and scaling the result to provide an estimate of the total rate, $\omega_m$.

These equations remove the $2\pi/SF$ rate limit. With this implementation, $\rho$ is the rate remainder and the counter $\eta_{\Delta\rho}$ represents the most significant part of the rate, adding into the angle reset counter, $\beta$. For low rates, $\eta_{\Delta\rho}$ would be zero.

Finally, when the system is first turned on and the gyro 10 is already experiencing a high rotation rate, the following equations should be used:

Rate Initialization $$r_0 = \frac{\omega_{init}}{k_{\omega\rho}} \tag{30}$$

$$n_{\Delta\rho} = \text{integer}\left(\frac{r_0}{2\pi}\right) \tag{31}$$

$$\rho = r_0 - 2\pi\, n_{\Delta\rho} \tag{32}$$

Where:

$\omega_{init}$ is the estimated initial rate.

$k_{\omega\rho}$ is the sensitivity of the Sagnac phase shift to $\omega$. ($k_{\omega\rho}$ is 1/SF based on calibration.)

$r_o$ is the initial rate scaled to the units of $\rho$.

$\eta_{\Delta\rho}$ is the number of $2\pi$ resets applied to $\rho$.

$\rho$ is the rate remainder.

It is thus seen that the apparatus provides a digitally operated fiber optics gyro in which the $2\pi/SF$ rate limit has been removed. Many changes will occur to those skilled in the art and I do not wish to be limited to the specific disclosures used in connection with the description of the preferred embodiment. I intend only to be limited by the following claims.

The embodiments of an invention in which an exclusive property or right is claimed are defined as follows:

1. In a digitally operated fiber optics gyro system including a light source, a light conducting coil, a splitter to direct the light from the light source to both ends of the coil so that the beams travel in opposite direction through the coil and when subjected to rotation produce a Sagnac phase difference, an optic device to produce a phase change difference in the counter rotating beams, the optic device being driven by a ramp signal which has a periodic $2\pi$ reset which produces a $2\pi/SF$ rate limit, a light sensor for receiving the light from the coil and producing an output indicative of the magnitude of light received which magnitude changes with the rate of rotation, the gyro also including a digital controller for producing a signal indicative of the angle of rotation of the gyro and a signal to produce the ramp input to the optic device, apparatus for eliminating the $2\pi/SF$ rate limit comprising:

means supplying the output of the light sensor to the digital controller;

means for storing the number of $2\pi$ resets; and means combining the light sensor output with the number of $2\pi$ resets to produce a signal indicative of the true rate of rotation.

2. Apparatus according to claim 1 wherein the optic device is a phase modulator.

3. Apparatus according to claim 1 further including an external source providing an input to the digital controller indicative of an estimate of the rate.

4. Apparatus according to claim 3 wherein the external source is a spinning mass gyroscope.

5. Apparatus according to claim 3 wherein the external source is a fiber optic gyro with greater rate range.

6. The method of providing rate extension to a digital fiber optic gyro having a light sensor to detect the output of the fiber coil and having $2\pi$ resets, comprising the steps of:

1) obtaining an output from the light sensor indicative of rate of rotation, 2) determining the increased rate of rotation which occurs between $2\pi$ resets, 3) counting the number of $2\pi$ resets, 4) scaling the number obtained in step 3); and 5) adding the result of step 4) to the value obtained in step 2) to obtain an output signal indicative of an estimate of the true rate.

7. Ther method of claim 6 including the further steps to be used when the gyro is initially spinning:

6) obtaining a rate estimate from an external source; and 7) adding the value from step 6) to step 1).

* * * * *